(12) United States Patent
Rampen et al.

(10) Patent No.: US 7,077,378 B2
(45) Date of Patent: Jul. 18, 2006

(54) ANNULAR VALVE

(75) Inventors: William H S Rampen, Edinburgh (GB); Niall J Caldwell, Edinburgh (GB); Uwe B P Stein, Edinburgh (GB)

(73) Assignee: Artemis Intelligent Power Limited, Edinburgh (GB)

( * ) Notice: Subject to any disclaimer, the term of this patent is extended or adjusted under 35 U.S.C. 154(b) by 24 days.

(21) Appl. No.: 10/498,615

(22) PCT Filed: Dec. 13, 2002

(86) PCT No.: PCT/GB02/05685

§ 371 (c)(1),
(2), (4) Date: Jun. 10, 2004

(87) PCT Pub. No.: WO03/052302

PCT Pub. Date: Jun. 26, 2003

(65) Prior Publication Data

US 2005/0067596 A1    Mar. 31, 2005

(30) Foreign Application Priority Data

Dec. 17, 2001 (GB) .................................. 0130160.5

(51) Int. Cl.
*F16K 31/02* (2006.01)

(52) U.S. Cl. ..................................... 251/65; 251/129.15
(58) Field of Classification Search .................. 251/65, 251/129.15, 129.17, 129.19; 137/516.13–516.23
See application file for complete search history.

(56) References Cited

U.S. PATENT DOCUMENTS

| 1,925,464 | A | 9/1933 | Schoene |
| 3,438,394 | A | 4/1969 | Nakib |
| 3,845,782 | A | 11/1974 | Nicholls et al. |
| 5,273,068 | A | 12/1993 | Durne |
| 5,441,679 | A | 8/1995 | Chalich |
| 5,673,656 | A | 10/1997 | Knob |

FOREIGN PATENT DOCUMENTS

| DE | 503771 | 7/1930 |
| DE | 8425037 | 8/1985 |
| FR | 514546 | 3/1921 |
| GB | 251472 | 5/1926 |
| GB | 1104308 | 2/1968 |
| NL | 60448 | 8/1947 |

*Primary Examiner*—David A. Scherbel
*Assistant Examiner*—Peter deVore
(74) *Attorney, Agent, or Firm*—Stephen H. Fland; Dann, Dorfman, Herrell and Skillman

(57) ABSTRACT

A valve assembly (1) operable to allow or prevent the flow of fluid to or from a working chamber of a fluid-operated machine, comprising radially spaced apart inner and outer annular valve seats (8, 15) defining an annular passage therebetween, a valve member comprising a sealing ring (21), and means (3, 7, 26, 25) for moving the valve member axially between a first position in which the sealing ring (21) is in seating engagement with the annular valve seats to close the annular passage to fluid flow therethrough and a second position in which the sealing ring (21) is spaced from the annular valve seats (8, 15) so that the annular passage is open to fluid flow therethrough. The valve assembly further comprises axially spaced apart first and second valve guide means (6) for guiding the valve member during axial movement between its first and second positions.

Figure 1:
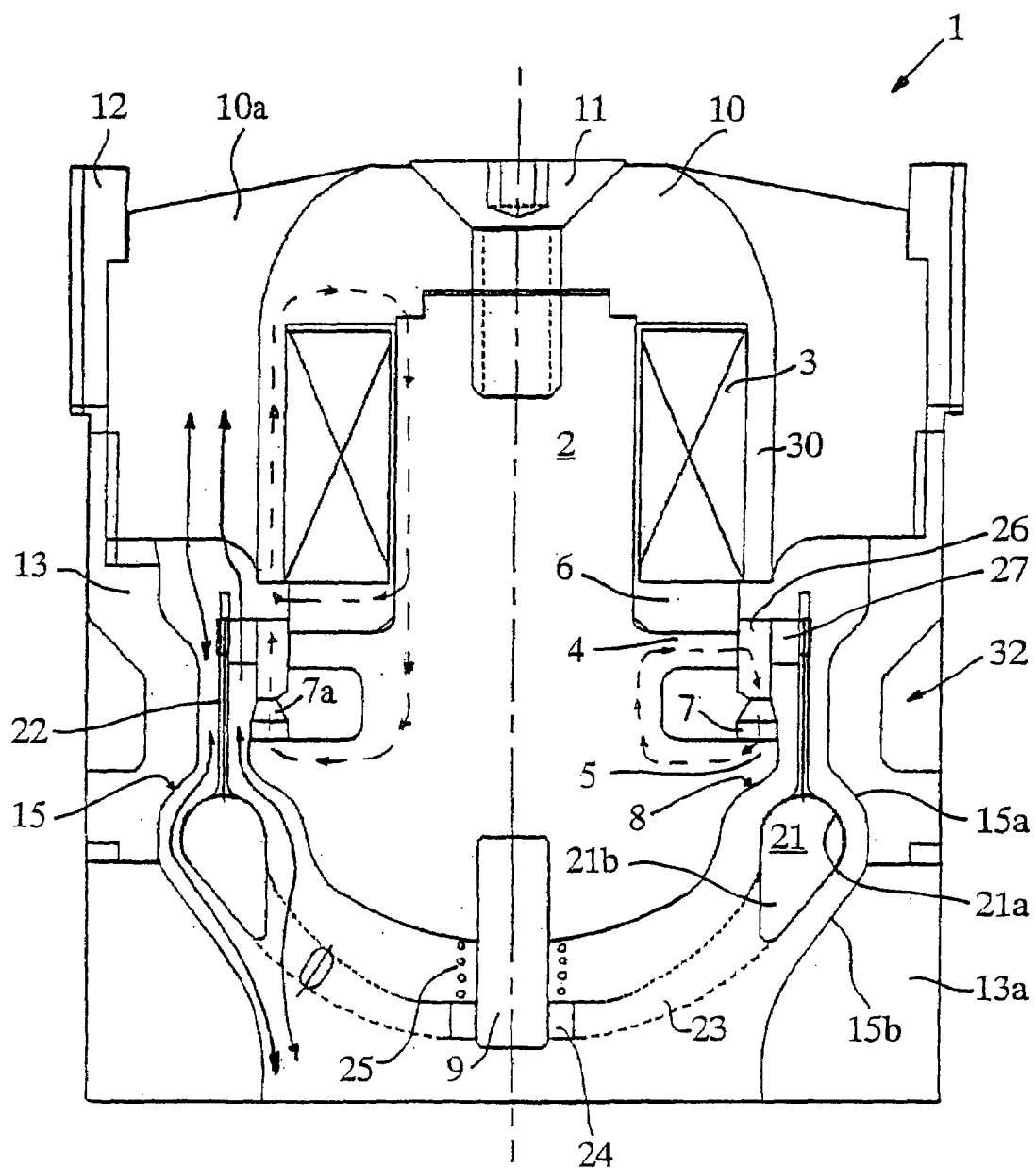

14 Claims, 2 Drawing Sheets

ANNULAR VALVE

This invention relates to a valve assembly, for example for a fluid-operated machine, such as a pump or motor, and in particular to valve assemblies for large fluid-operated machines which require very high flow rates through induction and delivery valves. The invention also relates to a fluid-operated machine provided with such a valve assembly.

It has been common practice, at least with fluid-operated machines working at low pressures and compressible flows, such as air compressors, to use annular plate valves with inner and outer annular passages to reduce induction pressure drop. However, to date, for high-pressure applications, poppet valves for fluid-operated machines have been limited to a single annular flow path.

Examples of known annular valves are shown in GB-A-251,472, GB-A-1,104,308, U.S. Pat. No. 1,925,464 and U.S. Pat. No. 5,673,656.

An aim of the present invention is to provide a high-pressure fluid-operated machine having an actively controlled annular valve member, e.g. a poppet valve, for the purpose of flow rectification.

According to one aspect of the present invention there is provided a valve assembly operable to allow or prevent the flow of fluid to or from a working chamber of a fluid-operated machine, the valve assembly comprising radially spaced apart inner and outer annular valve seats defining an annular passage therebetween for the flow of fluid therethrough, a valve member comprising a sealing ring, means for moving the valve member axially between a first position in which the sealing ring is in seating engagement with said annular valve seats to close said annular passage to fluid flow therethrough and a second position in which the sealing ring is spaced from said annular valve seats so that said annular passage is open to fluid flow therethrough, and axially spaced apart first and second valve guide means for guiding the valve member during axial movement of the latter between said first and second positions.

The use of a valve member having a sealing ring movable into and out of simultaneous contact with both the radially inner and outer annular seats permits the creation of two concentric fluid flow passages, effectively doubling the flow area through the valve passage over the conventional form for the same amount of axial valve displacement. This feature permits the pressure drop through a valve assembly of this conformation to be one quarter that for a similarly sized conventional poppet valve assembly.

When the valve member is seated, pressure acts across the area defined between the inner and outer circular lines of contact of the sealing ring with the inner and outer valve seats. The stress imposed on the "poppet" valve member is therefore much reduced since the core area, defined by the area inside the inner circular seating line of contact, is not part of the valve member and therefore is not subjected to the pressure loading of this region.

Conveniently the valve member further comprises first and second guide members positioned on opposite axial sides of the sealing ring, the first guide member cooperating with said first guide means and the second guide member cooperating with said second guide means. Preferably at least one of said first guide member and said first guide means comprises a cylindrical surface coaxial with the sealing ring. Preferably one of the second guide member and the second guide means comprises a coaxially positioned cylindrical member, such as a guide pin, and the other of said second guide member and said second guide means comprises a bearing, such as a bearing ring, within which the cylindrical member is received for relative sliding movement.

According to another aspect of the present invention there is provided a valve assembly operable to allow or prevent the flow of fluid to or from a working chamber of a fluid-operated machine, the valve assembly comprising radially spaced apart inner and outer annular valve seats defining an annular passage therebetween for the flow of fluid therethrough, a valve member comprising a sealing ring, means for moving the valve member axially between a first position in which the sealing ring is in seating engagement with said annular valve seats to close said annular passage to fluid flow therethrough and a second position in which the sealing ring is spaced from said annular valve seats so that said annular passage is open to fluid flow therethrough, the valve moving means comprising a ferrous annular moving pole member attached to the valve member, a permanent magnet arranged to magnetically urge the moving pole member so that the valve member is in its second position and coil means which can be energised to oppose the magnetic force of the permanent magnet acting on the moving pole member to cause the valve member to move to its first position. The valve member can be actuated by a strong electric pulse applied to the coil means, e.g. a solenoid coil, and then retained in its first position by a pulse-width modulated signal to reduce energy consumption and heating.

According to a further aspect of the present invention there is provided a valve assembly operable to allow or prevent the flow of fluid to or from a working chamber of a fluid-operated machine, the valve assembly comprising radially spaced apart inner and outer annular valve seats defining an annular passage therebetween for the flow of fluid therethrough, a valve member comprising a sealing ring, means for moving the valve member axially between a first position in which the sealing ring is in seating engagement with said annular valve seats to close said annular passage to fluid flow therethrough and a second position in which the sealing ring is spaced from said annular valve seats so that said annular passage is open to fluid flow therethrough, the inner and outer valve seats being constructed and arranged to have substantially the same axial elasticity.

Suitably the elasticity of the radially outer annular valve seat may be matched to that of the radially inner annular valve seat by designing the radially outer valve seat to flex or give in the axial direction. This can be accomplished, for example, by physically weakening the radially outer annular valve seat. Typically this is achieved by designing the outer annular valve seat to have one or more convolutions or recesses in its walls.

The valve member, or at least the sealing ring thereof, is suitably made of a polymeric material or a composite material composed of strong fibres in a polymer matrix so as to have the qualities of low mass, high resistance to creep, high strength, good temperature and fatigue resistance and low absorption of water, oil and other solvents. The inner and outer valve seats are shaped with smooth curves to give minimal resistance to both directions of flow.

According to a still further aspect of the present invention there is provided a valve assembly comprising radially spaced apart inner and outer annular valve seats defining an annular passage therebetween for the flow of fluid therethrough, a valve member comprising a sealing ring having a forward portion and a rearward portion, the sealing ring being movable axially between a first position in which the said forward portion is in seating engagement with said annular valve seats to close said annular passage to fluid flow therethrough and a second position in which the said forward portion is spaced rearwardly from said annular valve seats so that said annular passage is open to fluid flow therethrough, wherein said radially outer valve seat forms part of a radially outer seating surface which, in the direction rearwardly from said radially outer valve seat, has a converging portion part of which has a diameter less than that of the radially outer valve seat.

According to a yet further aspect of the present invention there is provided a fluid-operated machine having a cylinder with a working chamber and a valve assembly according to any one of said preceding aspects of the invention, the valve assembly being movable between its first and second positions to prevent or allow the flow of fluid through said annular passage to or from the working chamber.

Figure 2:
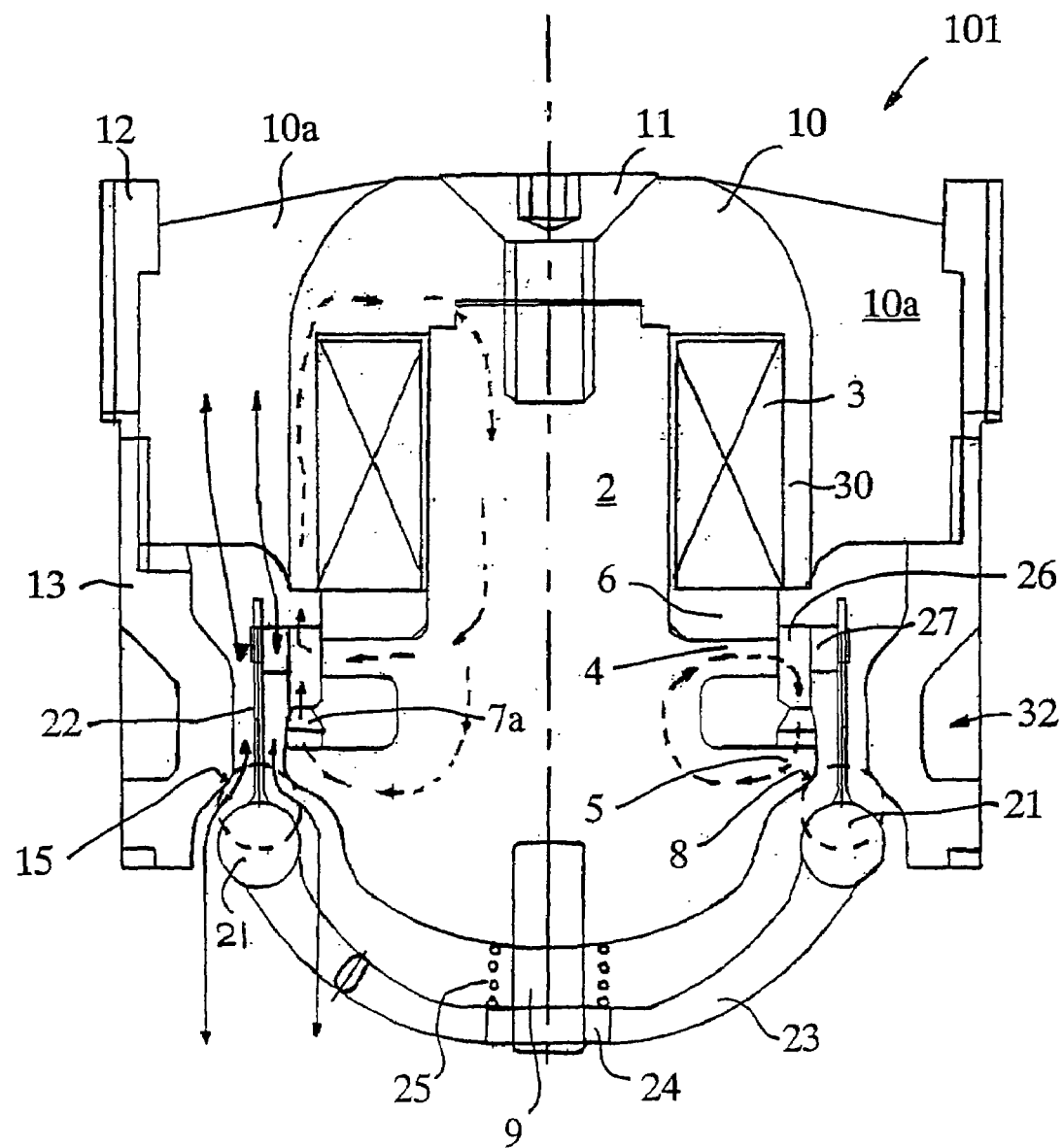

Embodiments of the invention will now be described, by way of example only, with particular reference to the accompanying drawings, in which FIGS. 1 and 2 are schematic sectional views of two different embodiments of a valve assembly, according to the present invention, of a fluid-operated machine.

FIG. 1 shows a valve assembly, generally designated by the reference numeral 1, intended to be fitted to the top of a working chamber (not shown) of a fluid-operated machine. The machine in question may be a large fluid power pump or motor where very high flow rates are required through the induction and delivery valves. Double headed arrows shown in full lines in the drawing illustrate fluid flow paths, the direction of the fluid flows depending on whether the machine operates as a pump or motor.

The valve assembly 1 has a central steel support 2 which carries a solenoid coil 3 at its upper end. The lower portion of the steel support 2 has two axially spaced apart annular portions 4 and 5. The upper annular portion 4 supports a guidance bush 6 having an outer surface which is preferably of circular cylindrical form. The lower annular portion 5 has a permanent magnet 7 fixed, e.g. bonded, to its upper surface and has a shaped outer surface defining a radially inner annular valve seat 8. A flux concentrating ring 7a is bonded to the upper surface of the magnet 7. An axially positioned guide pin 9 is fixed in an axially located bore at the bottom of the support 2.

A steel element 10 is fixed to the upper end of the support 2 by means of a bolt 11. The element 10 has a number, e.g. eight, of radially extending axial webs or fins 10a. A compression nut 12 is screwed down onto radially outer portions of these fins 10a and is screw-threadedly connected to a steel shroud 13. By tightening the nut 12 the shroud is securely retained on the fins 10a. The lower part of the shroud 13 is shaped on its inner surface to define a radially outer annular valve seat 15. The inner surface of the shroud 13 provided a seating surface with a diverging portion 15a which diverges away from the valve seat 15 in the downward axial direction. An additional shroud member 13a is fixed to the bottom of the shroud 13 and provides, on its radially inner surface, a converging portion 15b which converges in the downward axial direction. Thus in the downward axial direction the valve seat 15 extends into a diverging surface provided by portion 15a and a converging surface provided by portion 15b. The lower parts of the converging portion 15b have diameters less than the diameter of the valve seat 15. A generally annular fluid flow passage is defined between the radially spaced apart annular valve seats 8 and 15 and extends upwardly between inner surfaces of the bolt 12 and shroud 13 and outer surfaces of the steel support 2 and the element 10, the radial fins 10a dividing the upper end of the passage into a number of circumferentially spaced apart sub-passages.

The valve assembly further comprises a valve member comprising a sealing ring 21 having integrally formed therewith an upwardly extending cylindrical portion 22 and downwardly and inwardly extending ribs 23 supporting a bearing ring 24 in which the guide pin 9 is received. The ring 21 has, in cross section, a generally semi-circular upper portion 21a and a tapering lower portion 21b, the inner surface of which is substantially parallel with the axis of the ring 21 and the outer surface of which is inwardly inclined in the downward direction. Suitably the sealing ring 21 is made of a polymeric material or a composite material composed of strong fibres in a polymer matrix and has the qualities of low mass, high resistance to creep, high strength, good temperature and fatigue resistance and low absorption of water, oil and other solvents. A compression spring 25 is positioned around the pin 9 between the bottom of the support 2 and the bearing ring 24. The cylindrical portion 22 carries an annular ferrous moving pole member 26 by means of a number of circumferentially spaced apart radial webs 27.

In operation of the valve assembly 1 the valve member is by default held in its open position by the permanent magnet latch consisting of the ferrous annular moving pole member 26 which is magnetically attracted to the permanent magnet 7 bonded to the fixed ferrous annular portion 5. The magnetic circuit is such that the path of the magnetic flux (shown in dashed lines) describes a torus and retains the pole member 26 in its axially lowermost position so that the sealing ring is spaced from the valve seats 8 and 15 in an open position. This magnetic retaining force is designed to be several times greater than the maximum fluid force which acts on the valve during the up-stroke of the piston. In the open position of the valve member, fluid is able to pass though the annular passage radially inwardly and outwardly of the sealing ring 21. The inner and outer valve seats 8 and 15 are shaped with smooth curves to give minimal resistance to both directions of flow. The specific shaping of the ring portion 21b and the portions 15a and 15b are such that, in the open position of the valve member, the portions 15a and 15b extend around and beneath the sealing ring 21. In particular the forward portion 21a of the sealing ring 21 is spaced from the valve seat 15 a distance substantially the same as the distance of the rearward portion 21b of the sealing ring from the converging portion 15b. Some portions of the upwardly flowing (as viewed in FIG. 1) fluid flow over the upper and lower portions 21a and 21b of the sealing ring with a similar or comparable velocity.

The valve member is closed by electrically energising the solenoid coil 3 which is coaxial with the support 2 and is positioned radially inside a solenoid outer pole 30 formed by the element 10. The magnetic flux (see the dashed lines) induced in the outer pole 30 crosses the air gap between the lower end of the pole 30 and the moving pole member 26 and attracts the latter upwardly whilst also sending flux to oppose the permanent magnet 7 such that it is largely, but only temporarily, demagnetised. During the solenoid coil actuation the flux in the lower part of the moving pole member 26 is so reduced that it loses its hold on the flux concentrating ring 7a and accelerates towards the solenoid outer pole 30 with the result that the valve member is pulled upwardly into its closed position with the sealing ring 21 seating against the valve seats 8 and 15 and closing the annular passage to prevent fluid flow therethrough. The axial venturi force acting on the valve ring 21 to close the valve member against flow is reduced or eliminated by the shaping of the valve ring 21, with its portions 21a and 21b, and the portions 15a and 15b of the seating surface described above. This reduces the force required of the permanent magnetic latch, hence reducing the reaction time of the valve to a solenoid coil pulse and reducing the electrical power consumption.

The valve can be used in a number of configurations: passively latched open and actively closed; latched closed and actively opened; and actively opened and closed. In the cases where the actuation is unidirectional, there are further variations. The latch can provide a spring, based on the attraction of a permanent magnet, with a characteristic force curve following an inverse square law. Mechanical springs can be added to the mechanism which superpose on the magnetic force to create different return characteristics.

The inner valve seat 8 is supported on, or provided by, the steel member 2 that serves both as a structural member and as a flux path for the magnetic circuit to actuate and latch the valve member. The steel element 10 is rigidly fixed to the centre of the steel member 2 and has a solenoid outer pole 30 surrounding the coil. The radial ribs or fins 10a on the outer surface of the element 10 serve to mechanically locate the inner valve seat, and hold it concentric in the valve passage, while also allowing fluid to pass around the valve core with minimal disruption. It is difficult to prevent the structure, which holds the inner valve seat 8, from allowing a significant axial deflection of this seat whilst under load, due to the indirect load path through the radial ribs. The outer valve seat 15 is more directly attached to the restraining annular compression nut 12 and would normally deflect far less than the inner valve seat 8. In order to keep the loading equal on both inner and outer sealing lines, the outer valve seat "ring" is purposefully reduced in axial rigidity by the introduction of a convolution 32 in its structure. As pressure builds on the closed annular sealing ring 21 or poppet, it will cause both inner and outer valve seats to move equally. This will prevent rolling of the valve sealing ring 21 on the valve seats, which would limit life through fatigue and galling.

The annular sealing ring 21 is large in diameter relative to its length, which could cause difficulties with jamming and friction. For this reason two guidance bearings have been incorporated to ensure that the poppet motion is free of stiction and governed by the flow and latch forces alone. The first guidance bearing acts between the inside of the moving pole ring 26 and the cylindrical outer surface of the bush 6, which is suitably a stationary polymer disc, and which could also be integral with the coil bobbin. This guide ensures that the moving pole 26 maintains a consistent radial gap relative to the magnetic pole ridge on the inner seat member 2 and so prevents excessive unbalanced radial magnetic forces from building up.

The second guide is axially spaced from the first guide and is provided by the guide pin 9 and bearing ring 24 located below the sealing ring 21. The pin 9 is suitably formed of a hard metal. The radial fins 23 attached on their outer ends to the sealing ring 21 join onto the bearing ring 24. It is envisioned that the sealing ring 21, the fins 23 and the bearing ring 24 will be integrally moulded. The two guides will, in combination, constrain the poppet in all axes of motion other than the axial one, in which it must move to open and close, and the rotational one, which is of no concern. The mechanical spring 25 acts on the bearing ring 24 to speed the opening of the valve when the coil is de-energised and the sealing ring 21 is no longer held closed by pressure.

FIG. 2 illustrates an alternative embodiment of a valve assembly 51 according to the invention. In the two valve assemblies shown in FIGS. 1 and 2 the same reference numerals have been used to identify similar parts. The differences between the two designs are that in FIG. 2 the valve ring 21 has a substantially circular cross section and the lower shroud part 13a is not provided.

The invention claimed is:

1. A valve assembly operable to allow or prevent the flow of fluid to or from a working chamber of a fluid-operated machine, the valve assembly comprising radially spaced apart inner and outer annular valve seats defining an annular passage therebetween for the flow of fluid therethrough, a valve member comprising a sealing ring, valve moving apparatus for moving the valve member axially between a first position in which the sealing ring is in seating engagement with said annular valve seats to close said annular passage to fluid flow therethrough and a second position in which the sealing ring is spaced from said annular valve seats so that said annular passage is open to fluid flow therethrough, wherein the valve moving apparatus comprises a ferrous annular moving pole member attached to the valve member, a permanent magnet arranged to magnetically urge the moving pole member so that the valve member is in its second position and an electromagnetic coil which can be energised to oppose the magnetic force of the permanent magnet acting on the moving pole member to cause the valve member to move to its first position.

2. A valve assembly according to claim 1, further comprising axially spaced apart first and second valve guides for guiding the valve member during axial movement of the latter between said first and second positions.

3. A valve assembly according to claim 2, wherein the valve member further comprises first and second guide members positioned on opposite axial sides of the sealing ring, the first guide member cooperating with said first guide and the second guide member cooperating with said second guide.

4. A valve assembly according to claim 3, wherein at least one of said first guide member and said first guide comprises a cylindrical surface coaxial with the sealing ring.

5. A valve assembly according to claim 3, wherein one of the second guide member and the second guide comprises a coaxially positioned cylindrical member and the other of said second guide member and said second guide comprises a bearing within which the cylindrical member is received for relative sliding movement.

6. A valve assembly according to claim 1, wherein the inner and outer valve seats are constructed and arranged to have substantially the same axial elasticity.

7. A valve assembly according to claim 6, wherein the elasticity of the radially outer annular valve seat is matched to that of the radially inner annular valve seat by designing the radially outer valve seat to flex or give in the axial direction.

8. A valve assembly according to claim 7, wherein the radially outer annular valve seat has weakened portions.

9. A valve assembly according to claim 7, wherein the outer annular valve seat is provided with one or more convolutions or recesses in its walls.

10. A valve assembly according to claim 1, wherein said sealing member is made of a polymeric material.

11. A valve assembly according to claim 1, wherein said radially outer valve seat forms part of a radially outer seating surface which, in the direction rearwardly from said radially outer valve seat, has a converging portion part of which has a diameter less than that of the radially outer valve seat.

12. A valve assembly according to claim 11, wherein said radially outer seating surface has a diverging portion extending rearwardly of said radially outer valve seat and positioned forwardly of said converging portion.

13. A valve assembly according to claim 11, wherein when the valve member is in its second position the said forward portion of the sealing ring is spaced apart from the radially outer valve seat a distance substantially the same as the said rearward portion of the sealing ring is spaced from the said converging portion of the radially outer seating surface.

14. A fluid-operated machine having a cylinder with a working chamber and a valve assembly according to claim 1, the valve assembly being movable between its first and second positions to prevent or allow the flow of fluid through said annular passage to or from the working chamber.

* * * * *